(12) United States Patent
Ribeiro

(10) Patent No.: US 9,915,223 B2
(45) Date of Patent: Mar. 13, 2018

(54) PISTON, METHOD OF CONSTRUCTION, AND PISTON BODY PORTIONS THEREOF

(71) Applicant: FEDERAL-MOGUL CORPORATION, Southfield, MI (US)

(72) Inventor: Carmo Ribeiro, Ann Arbor, MI (US)

(73) Assignee: Federal-Mogul LLC, Southfield, MI (US)

( * ) Notice: Subject to any disclaimer, the term of this patent is extended or adjusted under 35 U.S.C. 154(b) by 0 days.

(21) Appl. No.: 15/096,377

(22) Filed: Apr. 12, 2016

(65) Prior Publication Data

US 2016/0222910 A1 Aug. 4, 2016

Related U.S. Application Data

(60) Division of application No. 13/677,022, filed on Nov. 14, 2012, now Pat. No. 9,334,957, which is a
(Continued)

(51) Int. Cl.
*B23K 20/12* (2006.01)
*F02F 3/00* (2006.01)
(Continued)

(52) U.S. Cl.
CPC ............ *F02F 3/003* (2013.01); *B23K 20/122* (2013.01); *B23K 20/129* (2013.01); *B23P 15/10* (2013.01);
(Continued)

(58) Field of Classification Search
CPC ...... F02F 3/003; F02F 3/22; F02F 2003/0061; B23K 20/122; B23K 20/129; B23K 2201/003; B23P 15/10; F16J 1/005
See application file for complete search history.

(56) References Cited

U.S. PATENT DOCUMENTS 3,930,472 A * 1/1976 Athenstaedt ........ F02B 23/0696
123/41.37
6,477,941 B1 * 11/2002 Zhu ........................ F02F 3/003
92/186
(Continued)

FOREIGN PATENT DOCUMENTS

DE 102007061601 A1 6/2009
JP 2009523942 A 6/2009
(Continued)

*Primary Examiner* — Ryan J Walters
(74) *Attorney, Agent, or Firm* — Robert L. Stearns; Dickinson Wright, PLLC

(57) ABSTRACT

A method of constructing a piston, piston formed thereby, and piston body portions are provided. The method includes providing an upper crown portion at least one annular upper rib depending from the upper combustion wall to a free end having a tapered peak. The method further includes providing a lower crown portion having at least one annular lower rib extending to a free end having a tapered peak. Then, moving the upper crown portion and the lower crown portion toward one another and initiating contact between the upper crown portion and the lower crown portion at their respective tapered peaks. Then, continuing moving the upper crown and the lower crown further toward one another after making initial contact at their respective tapered peaks and forming a friction weld joint between the free ends of the at least one upper rib and the at least one lower rib free end.

3 Claims, 4 Drawing Sheets

Related U.S. Application Data continuation of application No. 12/646,227, filed on Dec. 23, 2009, now Pat. No. 8,327,537.

(51) Int. Cl.
*F16J 1/00* (2006.01)
*B23P 15/10* (2006.01)
*F02F 3/22* (2006.01)
*B23K 101/00* (2006.01)

(52) U.S. Cl.
CPC ............... *F02F 3/22* (2013.01); *F16J 1/005* (2013.01); *B23K 2201/003* (2013.01); *F02F 2003/0061* (2013.01); *Y10T 29/49249* (2015.01); *Y10T 29/49252* (2015.01); *Y10T 29/49254* (2015.01); *Y10T 29/49256* (2015.01)

(56) References Cited

U.S. PATENT DOCUMENTS

| | | | |
|---|---|---|---|
| 8,286,852 B2* | 10/2012 | Kolbe | B23K 20/129 228/112.1 |
| 8,327,537 B2* | 12/2012 | Ribeiro | F02F 3/003 29/888.04 |
| 9,334,957 B2* | 5/2016 | Ribeiro | F16J 1/005 |
| 2008/0229923 A1 | 9/2008 | Gniesmer et al. | |
| 2009/0194059 A1 | 8/2009 | Grahle et al. | |
| 2010/0299922 A1 | 12/2010 | Gniesmer et al. | |

FOREIGN PATENT DOCUMENTS

| | | |
|---|---|---|
| WO | 2007031107 A1 | 3/2007 |
| WO | 2007082564 A1 | 7/2007 |

\* cited by examiner

PISTON, METHOD OF CONSTRUCTION, AND PISTON BODY PORTIONS THEREOF

CROSS-REFERENCE TO CO-PENDING APPLICATION

This U.S. Divisional Application claims the benefit of U.S. Continuation application Ser. No. 13/677,022, filed Nov. 14, 2012, which claims the benefit of U.S. application Ser. No. 12/646,227, filed Dec. 23, 2009, both of which are incorporated herein by reference in their entirety.

BACKGROUND OF THE INVENTION

1. Technical Field

This invention relates generally to pistons for internal combustion engines, and more particularly to pistons having an oil cooling gallery.

2. Related Art

Piston constructions having two substantially closed oil cooling galleries are known. These pistons have an annular, radially outer gallery and an open central gallery formed between upper and lower crown portions. The outer and central galleries can be isolated from one another or in fluid communication with one another via oil passages. In addition, it is known to provide pin lubrication passages extending from one or both of the galleries to a wrist pin. The lubrication passages can extend into a wrist pin bore of a pin boss and/or between laterally spaced pin bosses. The outer gallery is particularly effective in cooling a ring belt region of the piston, while the central gallery is particularly effective in cooling a central crown region formed in part by a combustion bowl wall, which is exposed to hot combustion gasses.

Aside from the combustion bowl being exposed to extreme heat, it is also exposed to extreme combustion forces. Accordingly, the combustion bowl wall needs to withstand the extreme combustion forces. With the central cavity being open beneath the combustion bowl wall, there is an unsupported central region of the combustion bowl wall directly above the central gallery. As such, the central region attains its structural support from a radially outer annular wall formed between the outer and central galleries. Accordingly, both the central region of the combustion bowl and the annular wall must be constructed having a suitable thickness and configuration to withstand the combustion forces generated in use.

SUMMARY OF THE INVENTION

A method of constructing a piston is provided. The method includes providing an upper crown portion having an upper combustion wall against which combustion forces directly act in the cylinder bore and at least one annular upper rib depending from the upper combustion wall to a free end having a tapered peak. Further, providing a lower crown portion having at least one annular lower rib extending to a free end having a tapered peak and a pair of pin bosses configured for receipt of a small end of a connecting rod therebetween. The method further includes moving the upper crown portion and the lower crown portion toward one another and initiating contact between the upper crown portion and the lower crown portion at their respective tapered peaks, and then, continuing moving the upper crown and the lower crown further toward one another after making initial contact at their respective tapered peaks and forming a friction weld joint between the free ends of the at least one upper rib and the at least one lower rib free end.

In accordance with a further aspect of the invention, the method further includes providing the upper crown portion with a pair of annular upper ribs depending from the upper combustion wall, one being an upper inner rib extending to a free end and the other being an upper outer rib extending to a free end having a tapered peak, and providing the lower crown with a pair of annular lower ribs, one being a lower inner rib bounding an inner gallery floor and extending to a free end and the other being a lower outer rib extending to a free end having a tapered peak. The method further includes moving the upper crown portion and the lower crown portion toward one another and initiating contact of the upper and lower outer ribs at their respective tapered peaks, and then, forming a friction weld joint between the upper outer rib free end and the lower outer rib free end.

In accordance with a further aspect of the invention, the method further includes maintaining the upper inner rib free end and the lower inner rib free end in spaced relation from one another to form an annular gap therebetween.

In accordance with a further aspect of the invention, the method further includes providing the upper and lower inner ribs with tapered peaks and initiating contact of the upper and lower inner ribs at their respective tapered peaks while moving the upper crown portion and the lower crown portion toward one another, and then, forming a friction weld joint between the upper inner rib free end and the lower inner rib free end.

In accordance with a further aspect of the invention, piston body portions configured for fixation to one another to form a piston are provided. The piston body portions include an upper crown portion and a lower crown portion. The upper crown portion has an upper combustion wall and at least one annular upper rib depending from the upper combustion wall to a free end having a tapered peak. The lower crown portion has at least one annular lower rib extending to a free end having a tapered peak and further including a pair of pin bosses configured for receipt of a small end of a connecting rod therebetween. The tapered peak of the at least one annular upper rib is configured for axial alignment and contact with the tapered peak of the at least one annular lower rib.

In accordance with a further aspect of the invention, the free end of the at least one annular upper rib and the free end of the at least one annular lower rib are substantially mirror images of one another.

In accordance with a further aspect of the invention, the upper crown portion has a pair of the annular upper ribs with each having free ends with tapered peaks and wherein the lower crown portion has a pair of the annular lower ribs with each having free ends with tapered peaks. The tapered peaks of the upper crown portion are configured for axial alignment and contact with the tapered peaks of the lower crown portion.

In accordance with a further aspect of the invention, the free ends of the pair of annular upper ribs and the free ends of the pair of annular lower ribs are substantially mirror images of one another.

In accordance with another aspect of the invention, a piston is provided. The piston includes a piston body having an upper crown portion and a lower crown portion. The upper crown portion has an upper combustion wall and a pair of annular upper ribs depending from the upper combustion wall. One of the annular upper ribs is an upper inner rib extending to a free end and the other of the annular upper ribs is an upper outer rib extending to a free end. The lower crown portion has a pair of annular lower ribs. One of the annular lower ribs is a lower inner rib extending to a free end and the other of the annular lower ribs is a lower outer rib extending to a free end. The lower crown portion further includes an inner gallery floor arranged radially inwardly from the annular lower inner rib and a pair of pin bosses depending generally from the inner gallery floor with a space provided between the pin bosses for receipt of a small end of a connecting rod. An annular outer cooling gallery is formed between the inner and outer ribs of the upper and lower crown portions and an annular central cooling gallery is formed radially inwardly from the inner ribs of the upper and lower crown portions. The inner ribs of the upper and lower crown portions are spaced axially from one another to provide an annular oil gap extending between the outer cooling gallery and the central cooling gallery.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
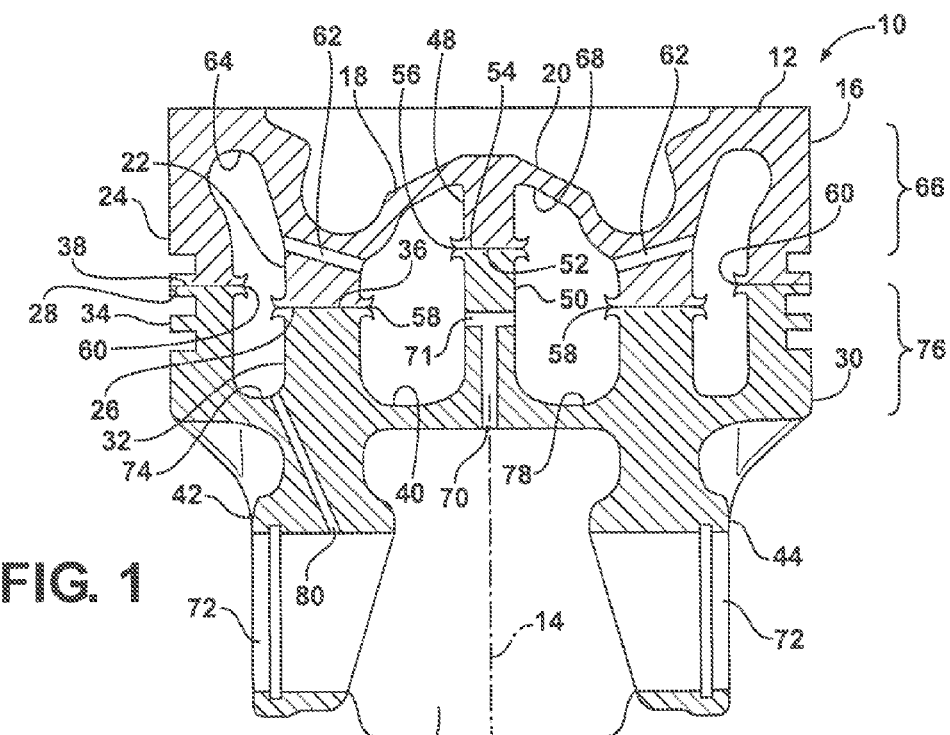
FIG. 1 is a cross-sectional view of a piston constructed in accordance with one presently preferred aspect of the invention.

Referring in more detail to the drawings, FIG. 1 illustrates a piston 10 constructed in accordance with one presently preferred aspect of the invention. The piston 10 has a piston body 12, such as preferably constructed of steel, although other material are contemplated to be within the scope of the invention, extending along a central axis 14 along which the piston body reciprocates within a cylinder bore (not shown). The piston body 12 includes an upper crown portion 16 having an upper combustion wall 18, represented here, by way of example and without limitation, as providing a recessed combustion bowl 20, against which combustion forces directly act in the cylinder bore. The upper crown portion 16 has at least one, and shown here as a pair of annular upper inner ribs, referred to hereafter as an upper inner rib 22 and upper outer rib 24, depending from the upper combustion wall 18 to respective free ends 26, 28. The piston body 12 further includes a lower crown portion 30 having at least one, and shown here as a pair of annular lower ribs, referred to hereafter as a lower inner rib 32 and lower outer rib 34, extending to respective free ends 36, 38 arranged in alignment for engagement with the free ends 26, 28. The lower crown portion 30 further includes an inner gallery floor 40 arranged radially inwardly from the lower inner rib 32 and a pair of pin bosses 42, 44 depending generally from the inner gallery floor 40 with a space 46 provided between the pin bosses 42, 44 for receipt of a small end of a connecting rod (not shown). In addition, the upper crown portion 16 and/or the lower crown portion 30, and shown here as both, have a respective central support post 48, 50 extending along the central axis 14 to respective free ends 52, 54. In accordance with a method of constructing the piston 10, an initial step includes initiating a friction weld joint 56 between the free ends 52, 54 of the upper and lower central support posts 48, 50. Then after initiating the friction weld joint 56, a subsequent step includes forming friction weld joints 58, 60 between the respective upper and lower inner rib free ends 26, 36 and the upper and lower outer rib free ends 28, 38 and then completing the friction weld joint 56 between the central support member free ends 52, 54.

Figure 1A:
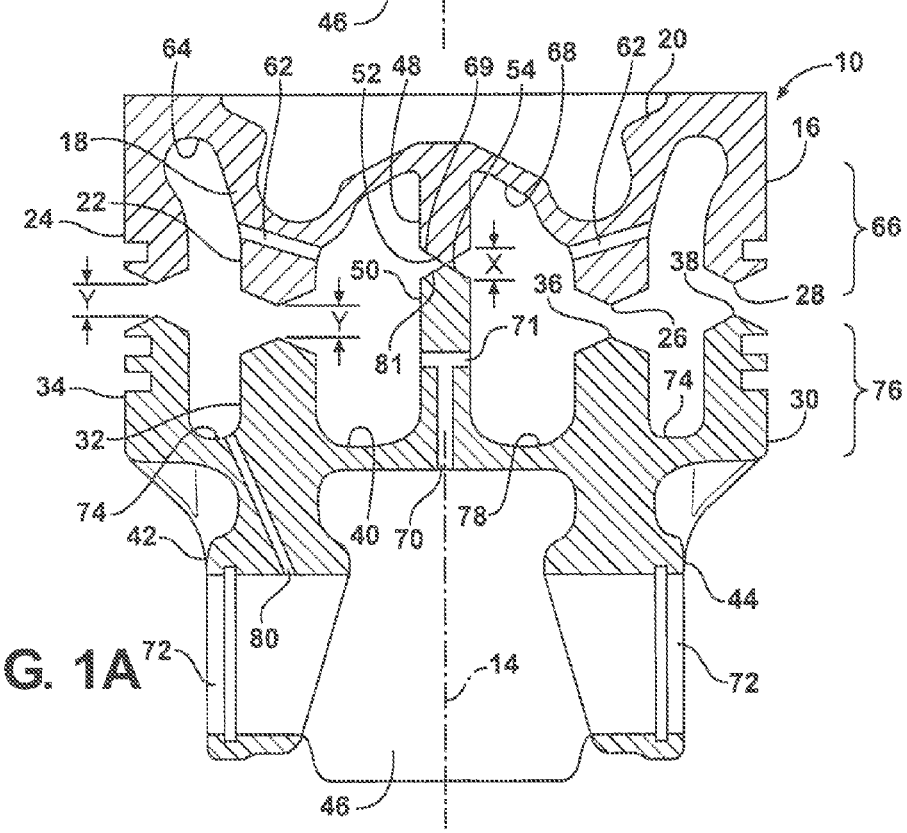
FIG. 1A is a view of the piston of FIG. 1 shown prior to forming any friction weld joints between an upper and lower crown portion thereof.

The upper crown portion 16 can be constructed having oil flow passages to facilitate cooling the piston, and is shown here as having a pair of oil flow passages 62 extending through the upper inner rib 22. The oil flow passages 62 are formed having a slightly ascending attitude extending from the central axis 14 radially outwardly. The location, geometry and angle of the oil flow passages 62 can be varied depending on the size of the oil gallery and the availability/volume of oil. The upper crown portion 16 is formed having an annular outer oil gallery pocket 64 extending from the inner and outer rib free ends 26, 28 upwardly into an upper ring belt region 66 and adjacent the upper combustion wall 18. The upper crown portion 16 is also formed having an annular inner oil gallery pocket 68 extending from the inner free end 26 and the central support post free end 52 upwardly and immediately beneath the combustion bowl 20. As shown in FIG. 1A, prior to fixing the upper crown portion 16 to the lower crown portion 30, the upper central support post free end 52 is provided having an end 69, such as a tapered, spherical, conical or pyramidal shape, by way of example and without limitation, and the lower central support post free end 54 is provided having an end 81, such as a tapered, spherical, conical or pyramidal shape, by way of example and without limitation.

The lower crown portion 30 can be constructed having oil flow passages to facilitate cooling the piston, and is shown here as having a T-shaped central oil flow passage 70 extending partially along the central axis 14, and thus, partially through the central support post 50. The oil flow passage 70 also has a cross opening 71 formed extending generally perpendicularly to the central axis 14 through the central support post 50. The oil flow passage 70 facilitates lubricating a wrist pin (not shown) that is received through the pin bores 72 in the pin bosses 42, 44. The lower crown portion 30 is formed having an annular outer oil gallery pocket 74 extending from the inner and outer rib free ends 36, 38 downwardly into a lower ring belt region 76. The lower crown portion 30 is also formed having an annular inner oil gallery pocket 78 extending from the inner free end 36 and the central support post free end 54 downwardly. In addition, an oil flow passage 80, such as disclosed in U.S. Pat. No. 6,477,941, which is incorporated herein by reference in its entirety, is formed extending from one of the pin bores 72 upwardly into the bottom of the outer oil gallery pocket 74. As such, oil is pumped from the pin bore 72 upwardly into the outer oil gallery pocket 74 (the oil can be pumped via oil cooling jet nozzles, not shown), circulated about the outer oil gallery pockets 64, 74, which combine to form a single outer oil gallery, and channeled inwardly through the oil flow passages 62 into the inner oil gallery pockets 68, 78, circulated through the inner oil gallery pockets 68, 78, which combine to form a single inner oil gallery, and channeled through the cross opening 71 and the oil flow passage 70 centrally onto the wrist pin to facilitate lubricating the wrist pin and small end of the associated connecting rod.

The method of construction, as mentioned above, involves a two step process, which includes a first step of initiating the friction weld joint 56 between the axially aligned central support posts 48, 50 prior to a second step, which includes initiating the friction weld joints 58, 60 between the inner rib free ends 26, 36 and the outer rib free ends 28, 38. While initiating the friction weld joint between the ends 69, 81 of the upper and lower central support posts 48, 50, the upper and lower crown portions 16, 30 are rotated relative to one another at a first, high rotational velocity. As shown in FIG. 1A, as the ends 69, 81 initially contact one another, the inner rib free ends 26, 36 and the outer rib free ends 28, 38 remain spaced axially from one another by a distance Y, and thus, the friction welding does not begin in this region. This allows the central support posts 48, 50 to begin melting prior to the initiating melting of the inner rib free ends 26, 36 and the outer rib free ends 28, 38. This in necessary to establish a good friction weld at the central support post 48, 50 due to the difference in rotational velocity between in inner central region, which is relatively slow in comparison to the rotational velocity at radially outward regions. After the friction weld has begun to become established between the central support posts 48, 50, the ends 69,81 diminish in height, such as by a distance X, wherein X is substantially equal to the distance Y, thereby eliminating the space between the inner rib free ends 26, 36 and the outer rib free ends 28, 38 and thus, bring the inner rib free ends 26, 36 and the outer rib free ends 28, 38 into frictional contact with one another. This begins the second step of initiating the friction weld joints 58, 60 between the inner rib free ends 26, 36 and the outer rib free ends 28, 38 and then completing the weld joints 56, 58, 60.

Figure 2:
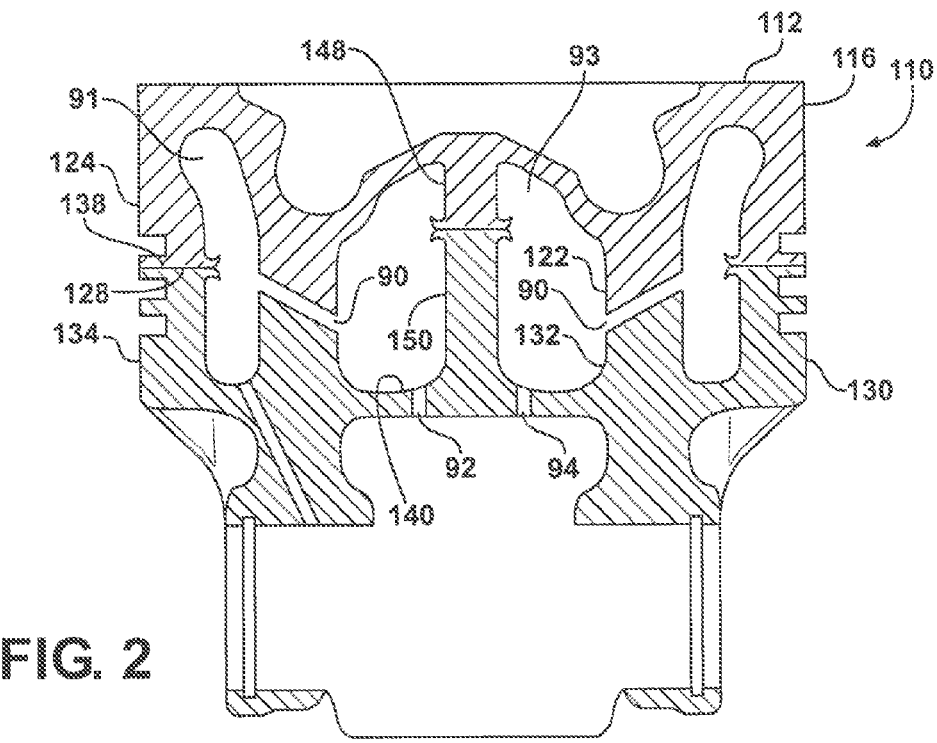
FIG. 2 is a cross-sectional view of a piston constructed in accordance with another aspect of the invention.

In FIG. 2, a piston 110 is shown in accordance with another aspect of the invention, wherein the same reference numerals as used above, offset by a factor of 100, are used to identify like features. The piston 110 has an upper crown portion 116 friction welded to a lower crown portion 130 using a similar two step welding process as discussed above, wherein the friction welding process is first initiated between a pair of axially aligned central support posts 148, 150, and then, free ends 128, 138 of upper and lower outer ribs 124, 134 are friction welded together. However, unlike the prior embodiment, the piston 110 does not friction weld a pair of upper and lower inner ribs 122, 132 together, but rather, maintains a space between the upper and lower inner ribs 122, 132 to provide an annular oil gap 90 extending between an outer cooling gallery 91 and a central cooling gallery 93. Accordingly, the oil within the outer cooling gallery 91 has a readily accessible, continuous annular path through which to flow into the central cooling gallery 93, thereby facilitating uniform cooling of the piston body 112 while avoiding pooling of oil, and thus, avoiding heating of pooled oil within the respective cooling galleries. It should be recognized that the thickness of the annular oil gap 90, along the axial direction, can be provided having a range of thickness, as desired. For example, if the annular oil gap 90 is desired to be relatively narrow, then the axial gap between the upper and lower outer ribs 124, 134 will be less than that if the desired annular oil gap 90 were desired to be relatively wide, and vise-versa. In addition, rather than providing an oil flow passage through the lower central support post 150, a pair of oil flow passages 92, 94 can be formed through an inner gallery floor 140 above a central portion of the wrist pin (not shown).

Figure 3:
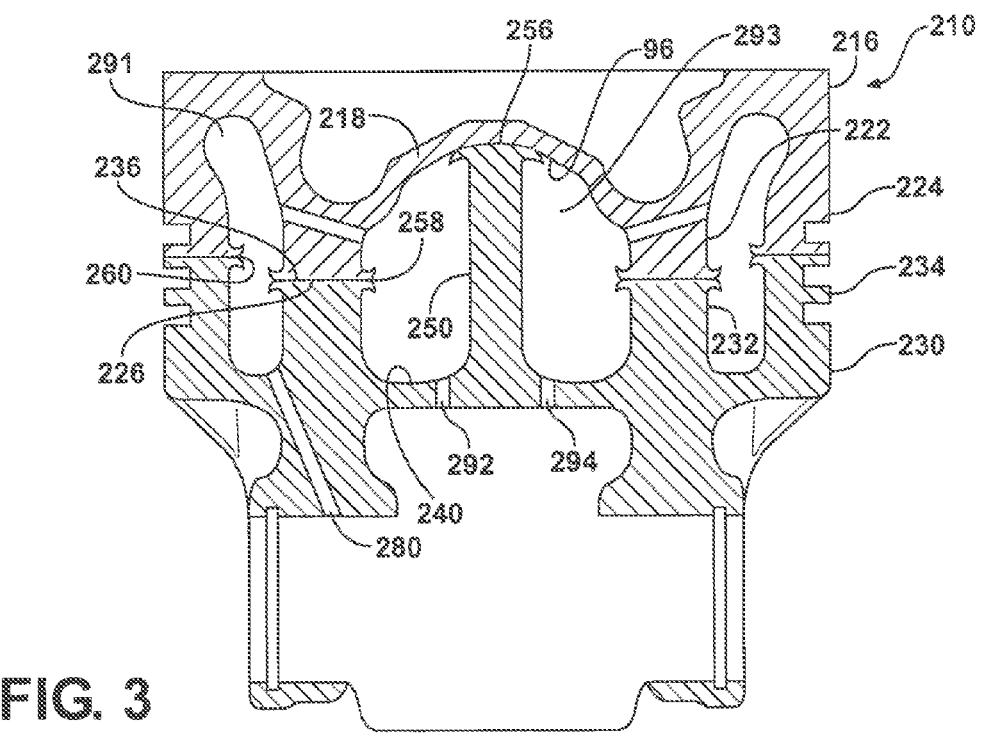
FIG. 3 is a cross-sectional view of a piston constructed in accordance with yet another aspect of the invention.
Figure 3A:
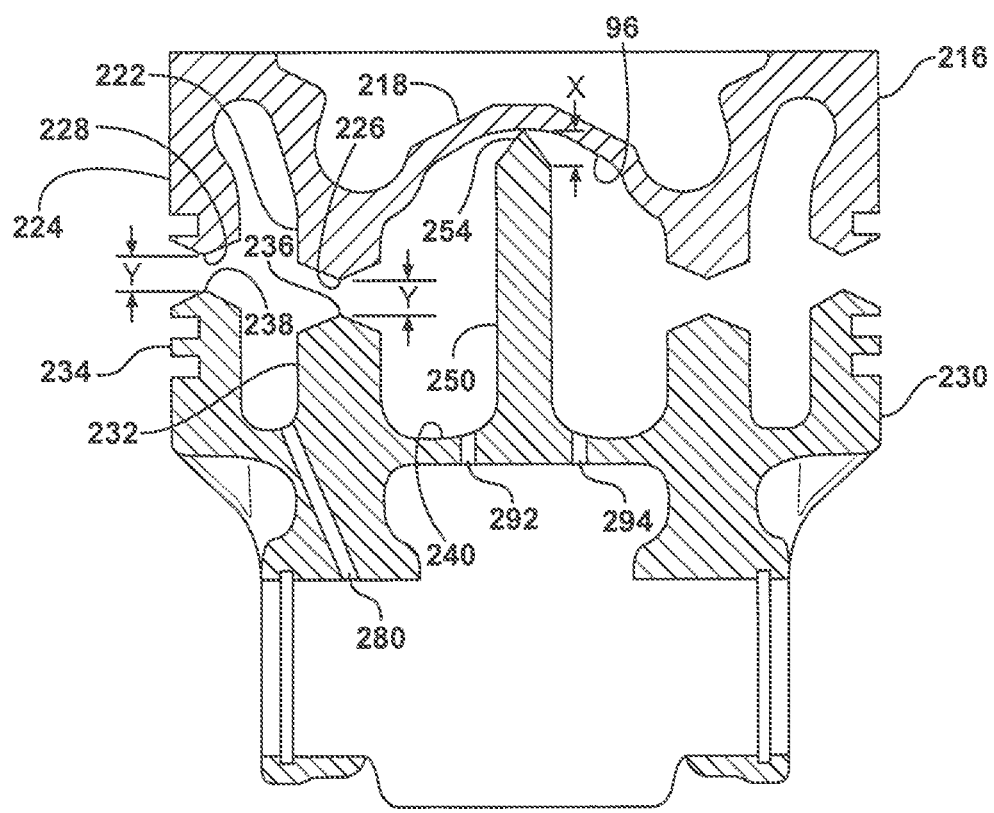
FIG. 3A is a view of the piston of FIG. 3 shown prior to forming any friction weld joints between an upper and lower crown portion thereof.

In FIG. 3, a piston 210 is shown in accordance with another aspect of the invention, wherein the same reference numerals as used above, offset by a factor of 200, are used to identify like features. The piston 210 has an upper crown portion 216 friction welded to a lower crown portion 230 using a similar two step welding process as discussed above, wherein the friction welding process is first initiated along an axially aligned central support post, however, rather than incorporating a pair of axially aligned central support posts, as with the previous pistons 10, 110, the piston 210 has a single central support post 250 constructed entirely as a single piece of material with the lower crown portion 230, wherein the central support post 250 is friction welded directly to an underside 96 of an upper combustion wall 218. As shown in FIG. 3A, the central support post 250 has a free end, represented as a free end, represented as a tapered free end 254, to facilitate the initial welding step, as discussed above. Also, the tapered free end 254 is provided having a length sufficient to engage the underside 96 of the upper combustion wall 218 prior to frictional engagement resulting between free ends 226, 236 of upper and lower inner ribs 222, 232 and between free ends 228, 238 of upper and lower outer ribs 224, 234. Accordingly, for the same reasons discussed above, a friction weld joint 256 is initiated between the central support post 250 and the underside 96 of the combustion wall 218 prior to initiating the respective friction weld joints 258, 260 between the upper and lower inner ribs 222, 232 and the upper and lower outer ribs 224, 234. Of course, upon initiating the weld joint 256 between the central support post 250 and the combustion wall 218, at an increased first rotational velocity, the second step includes initiating the friction weld joints 258, 260 between the upper and lower inner ribs 222, 232 and the upper and lower outer ribs 224, 234 at a reduced, second rotational velocity, as discussed above. Otherwise, the piston 210 has an oil flow passage 280 extending from a pin bore to an annular outer oil gallery 291 and a pair of oil flow passages 292, 294 extending through an inner gallery floor 240 into an annular central oil gallery 293.

Figure 4:
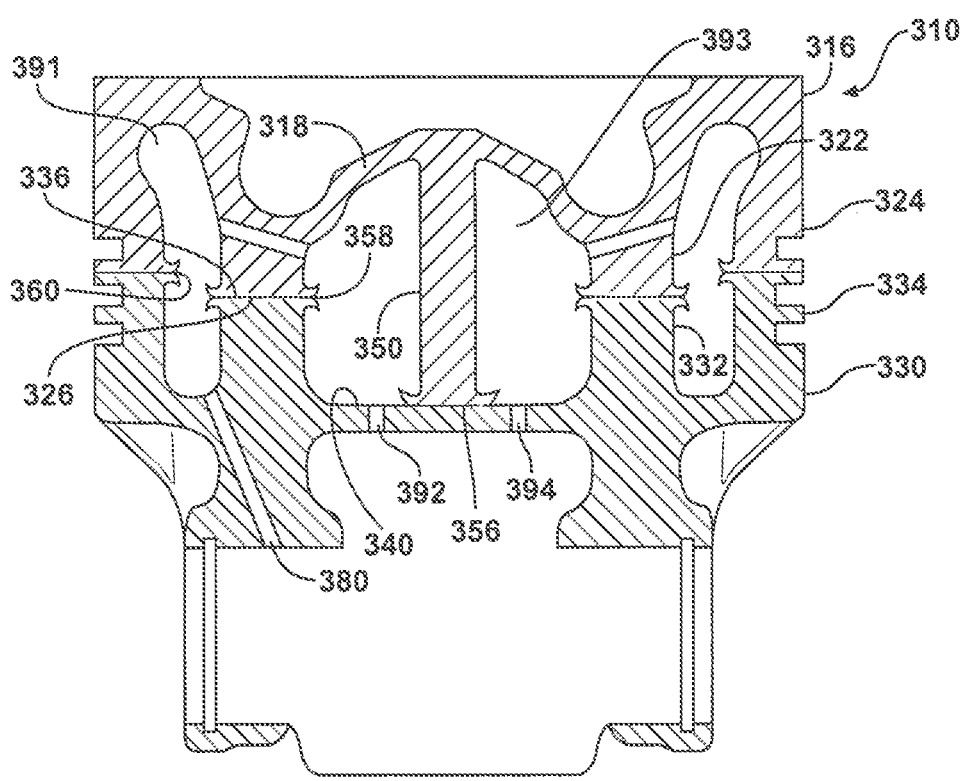
FIG. 4 is a cross-sectional view of a piston constructed in accordance with yet another aspect of the invention.

In FIG. 4, a piston 310 is shown in accordance with another aspect of the invention, wherein the same reference numerals as used above, offset by a factor of 300, are used to identify like features. The piston 310 has an upper crown portion 316 friction welded to a lower crown portion 330 using a similar two step welding process as discussed above, wherein the friction welding process is first initiated along an axially aligned central support post 350, wherein the entire central support post 350 is constructed as a single piece of material with the upper crown portion 316. The central support post 350 is friction welded directly to an inner gallery floor 340 of the lower crown portion 330. As with the embodiment illustrated in FIG. 3A, prior to welding, the central support post 350 has a length sufficient to engage the inner gallery floor 340 of the lower crown portion 330 prior to frictional engagement resulting between free ends 326, 336 of upper and lower inner ribs 322, 332 and between free ends 328, 338 of upper and lower outer ribs 324, 334. Accordingly, for the same reasons discussed above, a friction weld joint 356 is initiated between the free end of the central support post 350 and the inner gallery floor 340 of the lower crown portion 330 prior to initiating the respective friction weld joints 358, 360 between the upper and lower inner ribs 322, 332 and the upper and lower outer ribs 324, 334. Of course, upon initiating the weld joint 356 between the central support post 350 and the inner gallery floor 340, at an increased first rotational velocity, the second step includes initiating the friction weld joints 358, 360 between the upper and lower inner ribs 322, 332 and the upper and lower outer ribs 324, 334 at a reduced, second rotational velocity, as discussed above. Otherwise, the piston 310 has an oil flow passage 380 extending from a pin bore to an annular outer oil gallery 391 and a pair of oil flow passages 392, 394 extending through the inner gallery floor 340 radially outward from the central post 350 into an annular central oil gallery 393.

Obviously, many modifications and variations of the present invention are possible in light of the above teachings. It is, therefore, to be understood that within the scope of the appended claims, the invention may be practiced otherwise than as specifically described.

What is claimed is:

1. A method of constructing a piston, comprising:
    providing an upper crown portion having an upper combustion wall against which combustion forces directly act in the cylinder bore and at least one annular upper rib depending from the upper combustion wall to a free end having a tapered peak;
    providing a lower crown portion having at least one annular lower rib extending to a free end having a tapered peak and a pair of pin bosses configured for receipt of a small end of a connecting rod therebetween;
    moving the upper crown portion and the lower crown portion toward one another and initiating peak-to-peak contact between the upper crown portion and the lower crown portion at their respective tapered peaks; and
    forcing the upper crown and the lower crown further toward one another after making the initial peak-to-peak contact at their respective tapered peaks and while relatively rotating the upper and lower crowns to generate heat through mechanical friction sufficient to plastically displace and fuse the contacting surfaces in the form of a friction weld joint between the free ends of the at least one upper rib and the at least one lower rib free end.

2. The method of claim 1 wherein the at least one annular upper rib is provided in the form of a pair of annular upper ribs depending from the upper combustion wall, one being an upper inner rib extending to a free end having a tapered peak and the other being an upper outer rib extending to a free end having a tapered peak, and wherein the at least one annular lower rib is provided in the form of a pair of annular lower ribs, one being a lower inner rib bounding an inner gallery floor and extending to a free end having a tapered peak and the other being a lower outer rib extending to a free end having a tapered peak;
    and during the step of moving the upper crown portion and the lower crown portion relatively toward one another there is initial peak-to-peak contact made between the upper and lower outer ribs at their respective tapered peaks; and
    as a result of the relative rotation of the upper and lower crown portions, a friction weld joint is formed commencing at the contacting peaks and progressing radially to achieve a friction weld joint between the upper and lower inner and outer.

3. The method of claim 2 further including providing at least one of the upper and lower crown portions with a central post having a tapered peak at its free end and during the step of moving the upper and lower crown portions toward one another, engaging the tapered peak of the central post with an engaging surface of the respective other of the upper and lower crown members, with the central post and its respective engaging surface being dimensioned relative to said upper and lower inner and outer ribs so as to initially space the tapered peaks of the ribs from one another, and wherein the relative rotation causes commencement of friction welding of the center post before subsequent commencement of friction welding of the inner and outer upper and lower annular ribs maintaining the upper inner rib free end and the lower inner rib free end in spaced relation from one another to form an annular gap therebetween.

* * * * *